United States Patent
Lynch

(10) Patent No.: US 9,347,779 B1
(45) Date of Patent: May 24, 2016

(54) METHOD AND APPARATUS FOR DETERMINING A POSITION OF A VEHICLE BASED ON DRIVING BEHAVIOR

(71) Applicant: HERE Global B.V., Veldhoven (NL)

(72) Inventor: James D Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/566,490

(22) Filed: Dec. 10, 2014

(51) Int. Cl.
*G01C 21/26* (2006.01)
*G01S 19/13* (2010.01)

(52) U.S. Cl.
CPC .................. *G01C 21/26* (2013.01); *G01S 19/13* (2013.01)

(58) Field of Classification Search
CPC ........................................................ G01C 21/26
USPC ......................................................... 701/409
See application file for complete search history.

(56) References Cited

U.S. PATENT DOCUMENTS

| | | | | |
|---|---|---|---|---|
| 8,566,028 B2* | 10/2013 | Bradicich | .......... | G01C 21/3617 701/400 |
| 8,612,134 B2* | 12/2013 | Zheng | .................... | G01S 19/14 701/400 |
| 8,634,980 B1* | 1/2014 | Urmson | ............... | G05D 1/0214 701/23 |
| 8,718,861 B1* | 5/2014 | Montemerlo | .......... | B60W 30/00 701/26 |
| 8,719,198 B2* | 5/2014 | Zheng | .................... | G01C 21/20 706/21 |
| 8,768,616 B2* | 7/2014 | Kristinsson | ........ | G01C 21/3617 701/424 |
| 8,949,016 B1* | 2/2015 | Ferguson | ................. | B60Q 1/00 340/436 |
| 9,092,822 B2* | 7/2015 | Harris | .................... | G06Q 30/00 |
| 9,135,624 B2* | 9/2015 | Basir | ................ | G08G 1/096741 |
| 2014/0350777 A1* | 11/2014 | Kawai | .................. | G07C 5/0808 701/32.3 |
| 2015/0120336 A1* | 4/2015 | Grokop | ................. | B60W 40/09 705/4 |
| 2015/0134244 A1* | 5/2015 | Hershey | ............. | G01C 21/3617 701/489 |
| 2015/0142205 A1* | 5/2015 | Harsham | ........... | B60W 50/0097 701/1 |

* cited by examiner

*Primary Examiner* — Thomas Tarcza
*Assistant Examiner* — Alex C Dunn
(74) *Attorney, Agent, or Firm* — Ditthavong & Steiner, P.C.

(57) ABSTRACT

An approach is provided for determining a position of a vehicle relative to a travel path based on driving behavior. An estimation platform processes driving information associated with a vehicle, mapping information associated with a segment of the travel path in use by the vehicle, or a combination thereof to determine a behavior trace to associate with the vehicle. The estimation platform also determines an offset between the behavior trace of the vehicle and the behavior trace of one or more other vehicles based on a matching between the behavior trace of the vehicle and the behavior trace of the one or more other vehicles relative to the segment of the travel path.

16 Claims, 12 Drawing Sheets

100

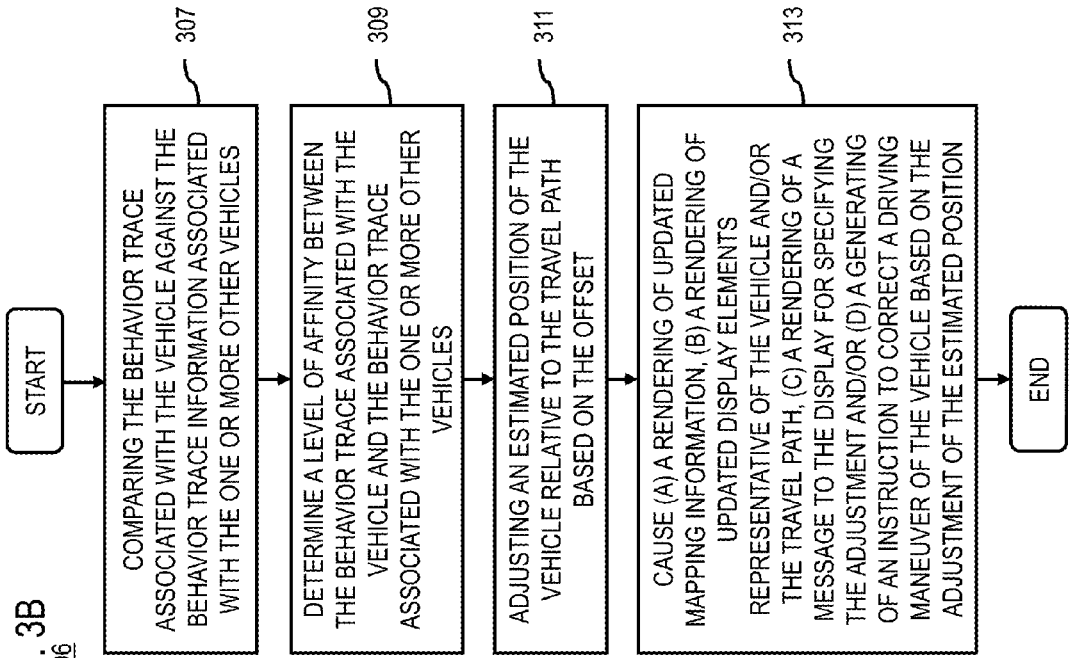
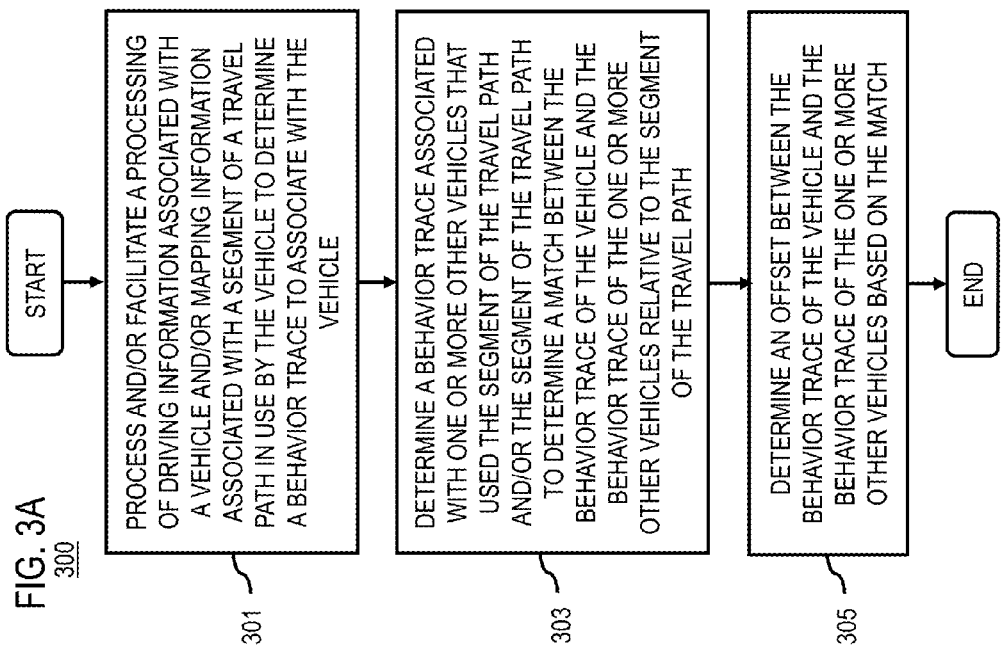

406

400

501

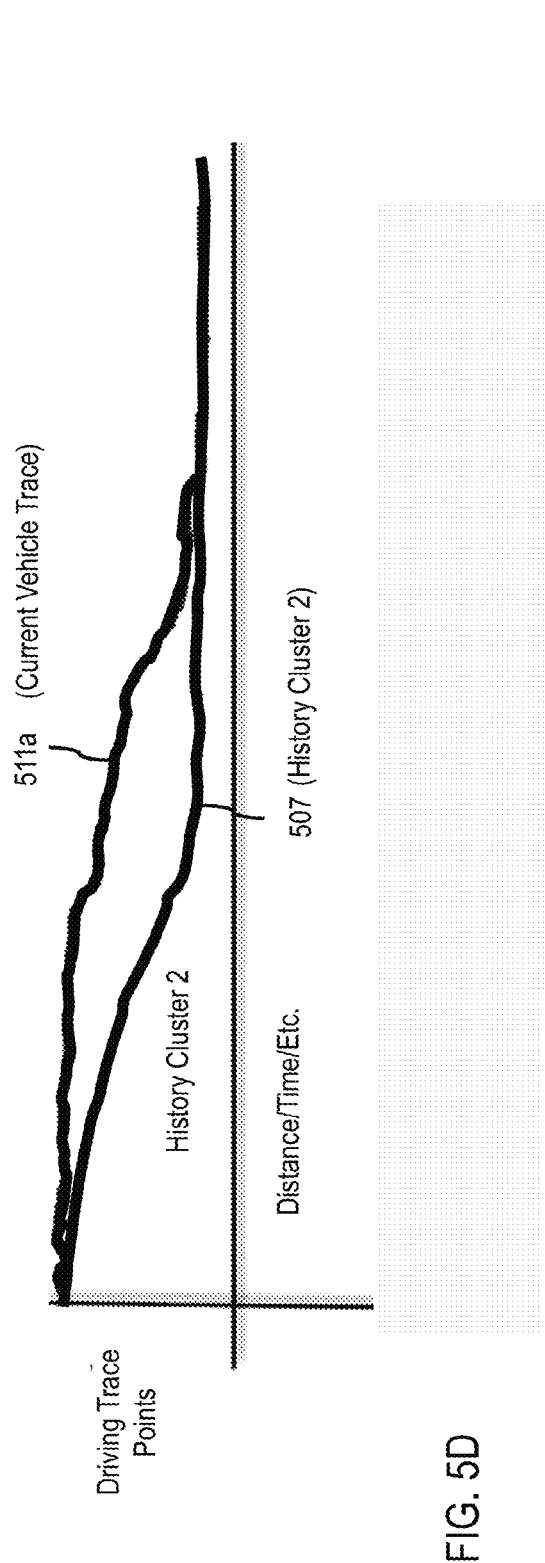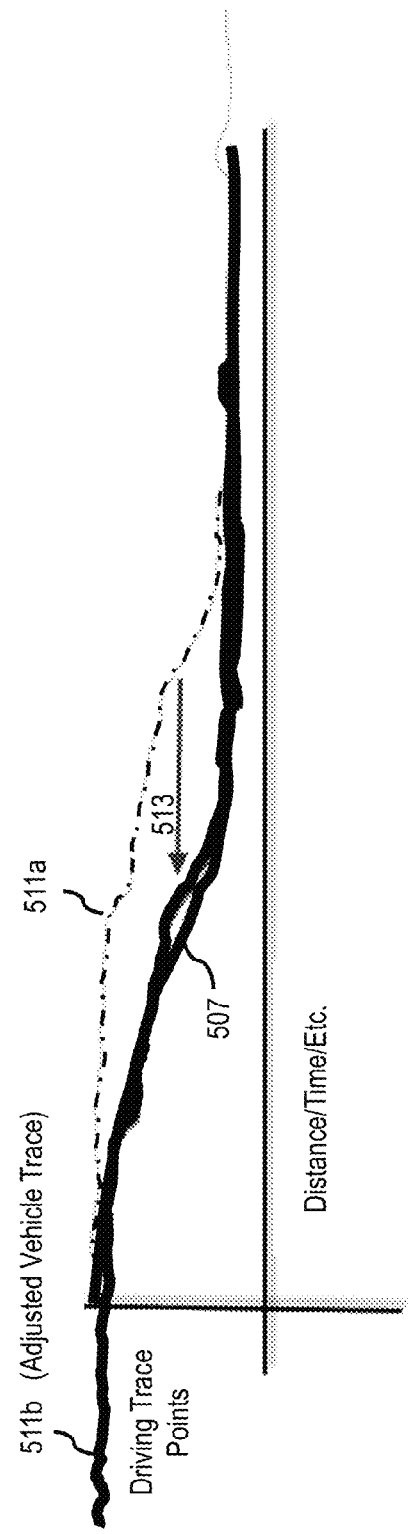

501

METHOD AND APPARATUS FOR DETERMINING A POSITION OF A VEHICLE BASED ON DRIVING BEHAVIOR

BACKGROUND

Service providers and device manufacturers (e.g., wireless, cellular, etc.) are continually challenged to deliver value and convenience to consumers by, for example, providing compelling network services. One area of interest has been the development of navigation services for estimating the position of a driver during travel as accurately as possible. Various techniques may be employed for tracking the vehicle as it travels along a roadway including global positioning system (GPS) based approaches. However, even slight variations in clock timing, changes in satellite configuration, environmental obstructions or the like may result in GPS drift and thus inaccurate tracking results. Other approaches, such as object or road geometry matching, rely upon the analysis of data collected by various onboard sensors of the vehicle as a means of position tracking Unfortunately, this capability may still result in error in instances where the physical object to be detected is not perceptible by the sensors.

SOME EXAMPLE EMBODIMENTS

Therefore, there is a need for an approach for determining a position of a vehicle relative to a travel path based on driving behavior.

According to one embodiment, a method comprises processing and/or facilitating a processing of driving information associated with a vehicle, mapping information associated with a segment of the travel path in use by the vehicle, or a combination thereof to determine a behavior trace to associate with the vehicle. The method also comprises determining a behavior trace associated with one or more other vehicles that used the segment of the travel path, the segment of the travel path, or a combination thereof to determine a match between the behavior trace of the vehicle and the behavior trace of the one or more other vehicles relative to the segment of the travel path. The method further comprises determining an offset between the behavior trace of the vehicle and the behavior trace of the one or more other vehicles based on the match.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of driving information associated with a vehicle, mapping information associated with a segment of a travel path in use by the vehicle, or a combination thereof to determine a behavior trace to associate with the vehicle. The apparatus is also caused to determine a behavior trace associated with one or more other vehicles that used the segment of the travel path, the segment of the travel path, or a combination thereof to determine a match between the behavior trace of the vehicle and the behavior trace of the one or more other vehicles relative to the segment of the travel path. The apparatus is further caused to determine an offset between the behavior trace of the vehicle and the behavior trace of the one or more other vehicles based on the match.

According to another embodiment, a computer-readable storage medium carries one or more sequences of one or more instructions which, when executed by one or more processors, cause, at least in part, an apparatus to process and/or facilitate a processing of driving information associated with a vehicle, mapping information associated with a segment of the travel path in use by the vehicle, or a combination thereof to determine a behavior trace to associate with the vehicle. The apparatus is also caused to determine a behavior trace associated with one or more other vehicles that used the segment of the travel path, the segment of the travel path, or a combination thereof to determine a match between the behavior trace of the vehicle and the behavior trace of the one or more other vehicles relative to the segment of the travel path. The apparatus is further caused to determine an offset between the behavior trace of the vehicle and the behavior trace of the one or more other vehicles based on the match.

According to another embodiment, an apparatus comprises means for processing and/or facilitating a processing of driving information associated with a vehicle, mapping information associated with a segment of the travel path in use by the vehicle, or a combination thereof to determine a behavior trace to associate with the vehicle. The apparatus also comprises means for determining a behavior trace associated with one or more other vehicles that used the segment of the travel path, the segment of the travel path, or a combination thereof to determine a match between the behavior trace of the vehicle and the behavior trace of the one or more other vehicles relative to the segment of the travel path. The apparatus further comprises means for determining an offset between the behavior trace of the vehicle and the behavior trace of the one or more other vehicles based on the match.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side, on the navigation system side, on the mobile device side or in any shared way between service provider, navigation system and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A, 3B, 4A and 4B are flowcharts of processes for determining a position of a vehicle relative to a travel path based on driving behavior, according to various embodiments;

FIGS. 5A-5E are diagrams for depicting the positioning and movement of vehicles relative to a travel path, according to various embodiments;

DESCRIPTION OF SOME EMBODIMENTS

Examples of a method, apparatus, and computer program for determining a position of a vehicle relative to a travel path based on driving behavior are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to autonomous vehicles, it is contemplated that the exemplary methods and systems described herein may be used in connection with any other location based service or application that relies on such data. This may include, for example, beacon or tracking systems, navigation and mapping systems, pattern recognition systems and any other like systems.

Figure 1A:
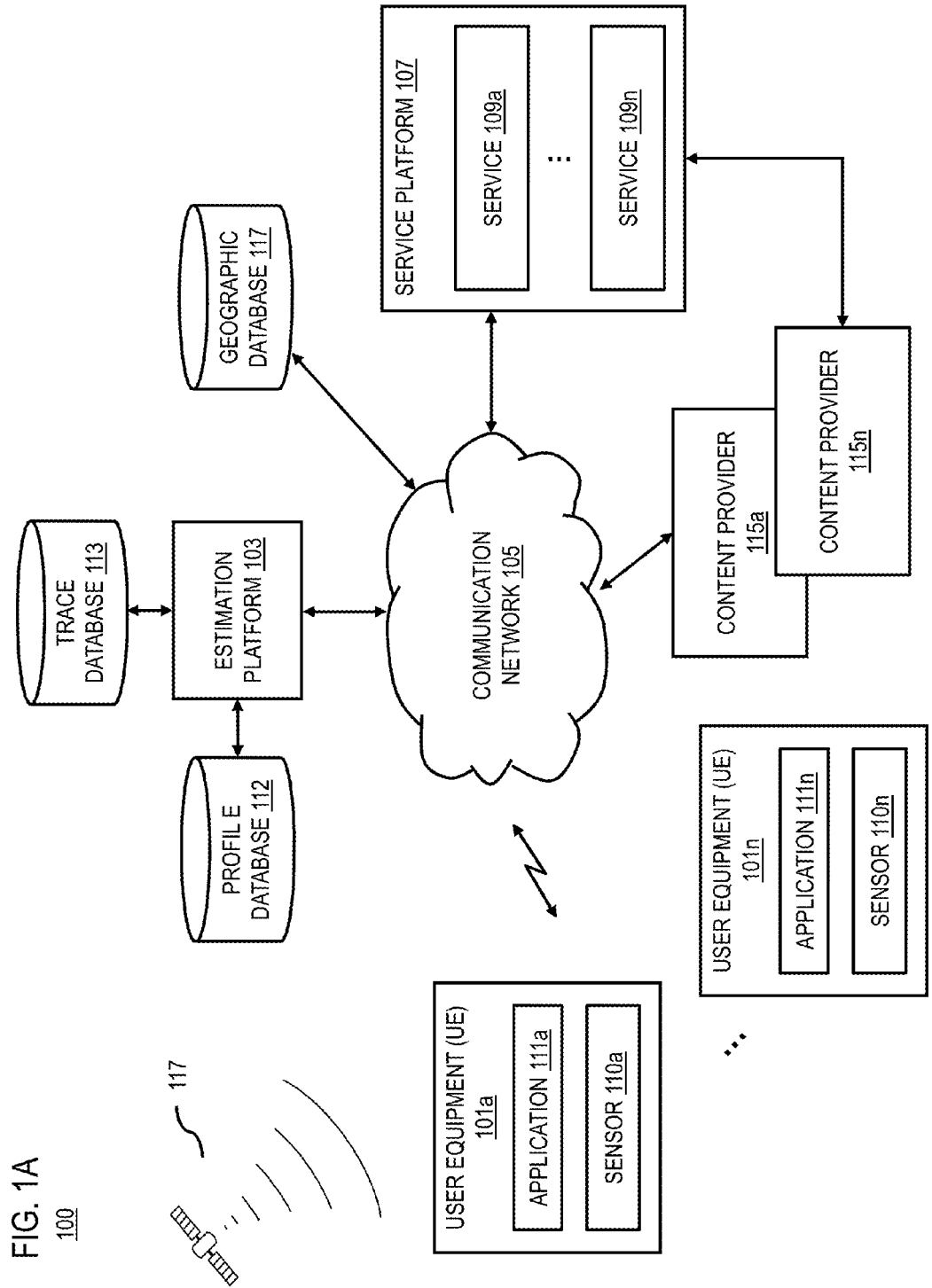
FIG. 1A is a diagram of a system for determining a position of a vehicle relative to a travel path based on driving behavior, according to one embodiment.

FIG. 1A is a diagram of a system for determining a position of a vehicle relative to a travel path based on driving behavior, according to one embodiment. For the purpose of illustration herein, driving behavior may pertain to any action, response or behavior exhibited (or to be exhibited) by a vehicle based on its current location, the navigation environment, the vehicle or driver status, the geometry of the travel path, etc. This may include, for example, a turning of the vehicle, a stoppage of the vehicle, a changing of acceleration of the vehicle, a changing of an operational mode of the vehicle (e.g., cruise control, manual drive mode, autonomous mode), an activation or deactivation of a function of the vehicle (e.g., high beam lights, windshield wipers), etc. It is noted that the driving behaviors may be classified as one or more response types or behavior types for specifying a response of the vehicle to a given stimuli as it travels along a travel path (e.g., a roadway, highway). Also of note, the driving behavior may account for a current or future position, location, placement, orientation or lane assignment of a vehicle relative to the travel path.

As discussed previously, service providers and device manufactures are increasingly interested in developing accurate, data rich, location-based services and navigation services that improve the overall driving experience. Similarly, the effectiveness of the data relied upon directly impacts the ability of a driver or an autonomous navigation system to accurately determine the position of a vehicle. For example, autonomous vehicles typically employ onboard navigation systems for interacting with a global positioning service (GPS), mapping service or the like to receive relevant location information, mapping information, for tracking the vehicle as it travels along a travel path (e.g., a roadway). Unfortunately, even slight variations in clock timing, changes in satellite configuration or environmental obstructions that block the passage of GPS signals may result in GPS drift, thus resulting in inaccurate tracking results. For example, a few seconds of GPS drift can translate into a number of meters of longitudinal or offset over time, which is not accurate enough for autonomous driving.

In some instances, positional improvement techniques may be employed to compensate for, or in connection with, the above described GPS based position/location tracking techniques. This may include techniques that involve the use of onboard sensors of the vehicle for detecting certain objects or roadway features and matching said objects or features to known reference locations on a map. For instance, a real-time feature recognition system of the vehicle may capture an image of an object located along the roadway (i.e., a road sign or landmark) or an amount of curvature of the roadway itself. The object or feature may then be cross referenced against a map database for enabling the recognition system to estimate the location of the vehicle based on known geographic location information for the object or roadway feature. In this case, the discrepancy between the position of the actual object or feature and that specified via the map is assumed to be the real-time position error. Unfortunately, this approach may result in errors in instances where the physical object to be detected is not recognized by the sensors and therefore unable to be cross-referenced properly.

To address this issue, system 100 of FIG. 1 enables navigation systems, i.e., as used by an autonomous vehicle or in connection with a mobile device, to evaluate an accuracy of a current position of a vehicle based on driving behavior data associated with the travel path. The system 100 accesses a trace database 113 and related geographic database 117 in order to obtain data for grouping, classifying and/or correlating various driving behaviors with specific segments of a travel path (e.g., a roadway). Per this approach, at least one driving behavior (e.g., a prevalent or predominant behavior pattern) exhibited by other vehicles that traveled the same travel path may be accounted for by the navigation system in order to: (1) determine a match between a current behavior of the vehicle and a historic behavior; (2) determine the amount of offset between the behaviors; and (3) adjust the estimated position of the vehicle based on the amount of offset.

By way of example, the estimation platform 103 may be implemented as a cloud based service, hosted platform or the like for performing the above described functions. Alternatively, the estimation platform 103 may be directly integrated for processing data generated and/or provided by one or more services 109a-109n, content providers 115a-115n or applications 111a-111n. Per this integration, the estimation platform 103 may translate location based information, navigation related content or the like into useful data for determining or correcting an estimated position of a vehicle based on a driving behavior associated with the travel path.

In one embodiment, an estimation platform 103 interfaces with one or more user equipment (UE) 101a-101n (also collectively referred to as UE 101) configured with one or more navigation applications 111a-111n (also collectively referred to as applications 111). The UE 101 may correspond to an onboard navigation system of a vehicle, a mobile device associated with a driver within the vehicle, or the like. The navigation applications 111 of the UE 101 acquire navigation information, location information, mapping information and other data regarding the current travel path of the vehicle, the whereabouts of the vehicle relative to the travel path, the movement of the vehicle about the travel path, etc.

In addition, the navigation applications 111 may interact with various sensors 110a-110n (also collectively referred to as sensors 110) for receiving and analyzing data regarding the vehicle, the user, other vehicles, conditions regarding the driving environment, etc. By way of example, sensors 110 (e.g., of a mobile device or embedded within the vehicle) may be used as GPS receivers for interacting with one or more satellites 117 to determine speed, position and location data of the vehicle. In addition, the sensors may gather tilt data (e.g., a degree of incline or decline of the vehicle during travel), motion data, light data, sound data, image data, weather data, temporal data and other data associated with the vehicle and/or UEs 101 thereof.

Still further, the sensors 110 may detect local or transient network and/or wireless signals, such as those transmitted by nearby devices during navigation of a vehicle along the travel path. This may include, for example, network routers configured within a premise (e.g., home or business), another UE 101 or vehicle or a communicable traffic system (e.g., traffic lights, traffic cameras, traffic signals, digital signage). It is further noted, in certain implementations, that the sensors 110 may correspond to, or operate in connection with, the sensors 110 of the vehicle for enabling data exchange and interaction. This exchange may be facilitated by way of any known or still developing range based or wireless communication protocols.

As will be discussed further, the estimation platform 103 enables the UE 101 to evaluate and adjust an estimated position determined for a vehicle relative to a segment of a travel path in order to achieve a more accurate position estimate result. For the purpose of illustration herein, the travel path may include any network of links (e.g., roadways, highways, terrain) or nodes (e.g., points of beginning, terminating or intersecting of a link) for enabling vehicular travel. As such, a single stretch of roadway, highway or terrain may comprise multiple different links and nodes. Also, links may be further segmented or partitioned, such as to represent a stretch of road at a time. For example, a link having an end-to-end (or node-to-node) length of L meters may comprise a number segments N, where each segment is of a length L N. It is noted that the segments, referred to herein as a segment of a travel path, may also be represented in terms of area or region accordingly. The exemplary embodiments herein may correspond to any known means of segmentation and/or representation of the travel path or segments thereof.

In one embodiment, the estimation platform 103 monitors and collects data, referred to herein as driving information, for specifying one or more actions or conditions of the vehicle. The driving information may include, for example, acceleration information, velocity information, heading information, bearing information, orientation information, curvature information, tilt information, or the like for a specific vehicle. In addition, the driving information may include data for specifying a function or operation of the vehicle, such as steering information, pedal usage information, wiper usage information, headlight usage information, navigation system usage information, stereo system usage information, vehicle state information, or a combination thereof.

It is noted that a set, or cluster, of the above described driving information may be aggregated and stored to the trace database 113 for a plurality of vehicles. Of further note, the driving information may be analyzed, i.e., based on analysis criteria, to determine a multi-variable state of driving behavior at a given segment of the travel path. The aggregation of data points comprising a driving information data set may be analyzed as a function of a single data point for enabling analysis of the shape, form and/or vector (trajectory) of driving behavior. For example, the aggregated data points may be represented as a first form when viewed over time, a second form when viewed over distance, etc. This form, as will be discussed further, enables the estimation platform 103 to perform shape or pattern matching/analysis, including for determining an amount of offset between respective behaviors for a common segment of a travel path.

By way of example, a set of data aggregated for a plurality of vehicles for a segment of highway featuring an exit ramp may specify the following: data for indicating a decrease in acceleration, a decline in tilt, a change in curvature and heading, an applied amount of brake pressure, an activation of the brake lights, etc., to within a predetermined threshold or variance factor. Under this scenario, this data may correspond to an EXIT behavior/action/response of the vehicle from the highway resulting from a downward, curved, exit ramp that connects to a street. In contrast, a steady or increased acceleration of the vehicle with limited to no change in curvature or tilt of the vehicle and limited to no brake pressure or brake light activation for the same segment of highway may be determined as CONTINUED DRIVING behavior of the vehicle along the highway. Each of these distinct behaviors may further be represented as behavior patterns, shapes or forms when viewed over a specific period of time, distance, etc.; each behavior referred to herein as a behavior trace.

It is noted, therefore, that a single segment of a travel path may be associated with one or more classifications or behavior traces, each representing a different driving behavior for that segment. Consequently, each behavior trace corresponds to a decision and/or action executed by a vehicle that traveled the same segment of the travel path over the course of time. The estimation platform 103 may therefore identify the classification of the data set, or cluster, based on an association of the driving behavior with the driving information regarding the specific segment of the travel path. For the purpose of illustration herein, the term "trace" refers to the ability of the estimation platform 103 to "track" or "trace" vehicle behavior based upon multiple data points for representing multiple decisions and/or actions relative to a confined portion, region or area of roadway over a given period.

Also, a behavior trace associated with a specific segment of a travel path may be further associated with mapping information regarding the segment. The mapping information may include data corresponding to, or representative of, the respective segments of the travel path within a geographic range. By way of example, image or textual content, location coordinates, point of interest information, navigation instructions or any other data representative of or related to a segment of the travel path may be associated with its corresponding behavior and/or response type(s). It is noted, therefore, that a behavior trace may be associated with the driving information or mapping information associated with any UE 101 that is configured to interact with the estimation platform 103 via a communication network 105. Furthermore, a predominant behavior, or driver response to the particular segment of the travel path, may be specified in association with mapping information representative of the segment. As noted previously, the classification may correspond to a specific shape, form or vector for characterizing the behavior relative to a finite portion of a travel path.

In one embodiment, the estimation platform 103 may be configured to interface directly with a service platform 107 for accessing various location based services 109*a*-109*n* (also collectively referred to as services 109) and content associated therewith. The estimation platform 103 may also interface with one or more content providers 115*a*-115*n* (also collectively referred to as content providers 115) that provide/deliver content of various types and genres (e.g., navigation content, travel content, locality content, marketing content) upon request. Still further, the estimation platform 103 may interface with a geographic database 117 for maintaining the mapping information for a specific segment of the travel path. It is noted that the service platform 107 and content providers 115 may interact with the geographic database for retrieving content, maps, waypoint data, point of interest data and other information related to or representative of a travel segment, its surrounding environment, etc.

In one embodiment, the estimation platform 103 analyzes driving information associated with a vehicle along with the aforementioned mapping information in order to determine a current driving behavior of the vehicle. By way of example, the estimation platform 103 may be configured to periodically or continuously interact with the application 111 in order to acquire sensor data regarding the vehicle, the driver or the travel path. Once acquired, the estimation platform may evaluate the sensor data (as driving information) against predetermined evaluation criteria in order to determine the current behavior classification corresponding to the driving information. This may include aggregating the driving trace data over time into an identifying pattern (behavior trace).

In another embodiment, the estimation platform 103 determines whether the current behavior matches an expected behavior of the vehicle for the given segment of the travel path. The expected behavior of the vehicle may be specified in association with the mapping information for the corresponding segment of the travel path. Under this scenario, the expected behavior be based upon analysis of the aggregated/crowd sourced driving information of one or more other vehicles that used the travel path in the past. As such, when the real-time/current driving behavior trace associated with the vehicle does not match the historic driving behavior trace, the estimation platform 103 determines the current estimated position of the vehicle as well as the amount of difference between the current estimated position of the vehicle and an expected estimated position of the vehicle.

By way of example, the estimation platform 103 may compare a movement type and/or maneuver pattern performed by the vehicle, as indicated by a current behavior trace for the vehicle, to a historical movement type and/or maneuver pattern performed by the one or more other vehicles. This may correspond to an offset reaction "shape" matching process, wherein the affinity between the movement type and/or maneuver pattern indicates an affinity with a particular driving behavior associated with the segment of the travel path.

In one embodiment, the level of affinity is determined by the estimation platform 103 in order to associate the current behavior trace with a single, best matching behavior trace associated with the segment of the path of travel. For example, in the case where a segment of the travel path is associated with a first cluster of driving information for indicating CONTINUED DRIVING behavior and a second cluster of driving information for indicating EXIT SLIGHT RIGHT behavior; the estimation platform 103 may select the EXIT SLIGHT RIGHT behavior as the best match to the current driving information based on an extent of matching of curvature, acceleration, pattern, movement, or other driving characteristics. Under this scenario, the level of affinity may correspond to a likelihood/probability that a driving behavior of the vehicle is related to a known driving behavior for the corresponding segment of the travel path.

In one embodiment, when a high accuracy shape/behavior match exists, the estimation platform 103 determines an amount by which the estimated position of the vehicle along the travel path (e.g., a distance or degree) must be adjusted in order for the current and expected driving behavior traces to match. The amount corresponds to a offset, which may include an amount of longitudinal distance, an amount of latitudinal distance, a geospatial coordinate shift, a time variance, or a combination thereof. The offset may correspond to an amount required for the estimation platform 103 to adjust the estimated position by in order to align the current driving behavior with the expected/historical driving behavior. Under this scenario, the historical driving behavior serves as a reference point and/or corresponding reference data cluster set (e.g., curvature, acceleration, tilt) for evaluating current driving activity.

In one embodiment, the estimation platform 103 may also assign a confidence score to the estimated position of the vehicle upon analyzing the driving information for the vehicle. Under this scenario, the confidence score may be assigned based on how well the behavior trace matches, or has affinity, with a previously determined behavior trace associated with the segment of the travel path. For example, if the shape of a behavior trace for a vehicle matches a historic behavior trace of the vehicle and there is little offset (e.g., to within a predetermined threshold), a high confidence score is assigned to the current vehicle position. In contrast, if the behavior traces do not match well, the estimation platform 103 assigns a low confidence score to the estimated position.

In one embodiment, the estimation platform 103 adjusts the estimated position of the vehicle accordingly based on the determined offset. This may include, for example, replacing or updating the original estimated position of the vehicle with the adjusted estimated position in order to compensate for behavior dynamics associated with the segment of the travel path. As such, the estimation platform 103 establishes and/or corrects the position based on behavior dynamics—i.e., movement type and/or maneuver pattern matching—rather than physical object and/or road geometry matching. Similarly, the estimation platform 103 establishes and/or corrects the estimated position of the vehicle based on the level of affinity between the current behavior trace and at least one (best matching) behavior of the segment of the travel path.

In one embodiment, the estimation platform 103 initiates various actions based on the corrected position. By way of example, the estimation platform 103 may cause updated mapping information and associated display elements representative of the vehicle and/or travel path to be rendered to the display of the UE 101. This may correspond to a change in the location of various icons for depicting the position or location of the vehicle relative to an image of the travel path as a result of a correction. As another example, the estimation platform 103 may cause a message to be displayed to the display of the UE 101 for specifying the corrected position. This message, in certain instances, may be presented in conjunction with the updated mapping information and/or display elements. It is noted that the message may also specify a confidence score in association with the estimated position of the vehicle.

As another example, the lane assigned to a vehicle based on the estimated position of the vehicle may be adapted to reflect an adjustment to the estimated position. Still further, the estimation platform 103 may generate an instruction to correct a driving maneuver of the vehicle based on the correction. Under this scenario, the instruction may be submitted the UE 101 for affecting an autonomous driving capability of the vehicle. For example, a driving maneuver to be performed by a navigation system (e.g., UE 101) for exiting a highway at a certain time may be adapted based on a corrected estimated position for indicating the vehicle actually has fewer seconds available to proceed to the exit lane. Under this scenario, the estimation platform 103 adapts the navigation instruction to cause the vehicle to take the next exit.

Still further, the estimation platform 103 may also match a current behavior trace of a vehicle to a historic behavior trace for the segment of the travel path in order to distinguish and/or verify a travel path being used by the vehicle. For example, when a vehicle is near an exit ramp or a road split, there may be one or more links available for use by the vehicle. In the case where the actual road taken is ambiguous due to GPS position uncertainty, the current vehicle's behavior trace may be compared to the historic behavior traces for ALL possible connected travel paths. Hence, the estimation platform 103 may account for the interconnection of respective links, and therefore, behaviors relative to the travel path.

It is noted that the estimation platform 103 may be configured to operate in connection with any known navigation system for enabling the initiation of instructions to be executed by the vehicle, by a driver of the vehicle, or a combination thereof. This may include, for example, autonomous vehicles having an embedded UE 101. Under this scenario, the autonomous vehicle may communicate with other autonomous vehicles configured to interact with the estimation platform 103. As such, the estimation platform 103 may determine optimal driving behaviors and/or responses for the vehicles based on current sensor information, coordinate driving maneuvers for the vehicles, or the like with respect to a current or next segment of a travel path navigated by the vehicles.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, estimation platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
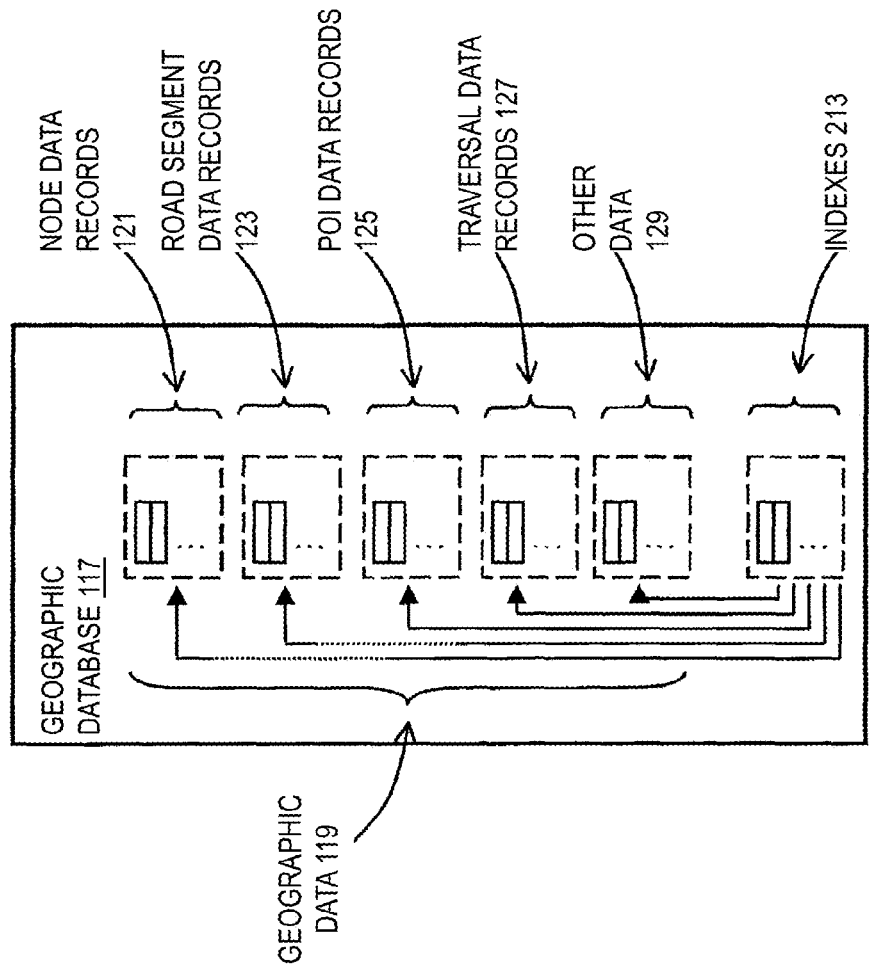
FIG. 1B is a diagram of a geographic database, according to one embodiment.

FIG. 1B is a diagram of a geographic database, according to one embodiment. In one embodiment, geographic data 119 regarding the travel path may be stored, associated with, and/or linked to the estimation platform 103 by way of the geographic database 117. The geographic or map database 117 includes geographic data 119 used for (or configured to be compiled to be used for) navigation-related services. For example, the geographic database 117 may include node data records 121, road segment or link data records 123, POI data records 125, traversal data records 127, other data records 129, and indexes 213 to the geographic data 201. More, fewer, or different data records may be provided. In one embodiment, the other data records 129 include cartographic ("carto") data records, routing data, and maneuver data.

In one embodiment, the road segment data records 123 are links or segments representing roads, streets, or paths. The node data records 121 are end points corresponding to the respective links or segments of the road segment data records 123. The road link data records 123 and the node data records 121 represent a road network, such as used by vehicles, cars, and/or other entities. Alternatively, the geographic database 117 contains travel path segment and node data records or other data that represent pedestrian paths, vehicular paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 may include data about the POIs and their respective locations in the POI data records 125. The geographic database 117 may also include data about places, such as cities, towns, or other communities, and other geographic features, such as bodies of water, mountain ranges, etc. Such place or feature data may be part of the POI data 125, such as a data point used for displaying or representing a position of a city. In addition, the geographic database 117 may include data about location-based events and their respective locations in the event data records 123. By way of example, the location-based events include any type of event that is associated with a particular location including, for instance, traffic, accidents, construction, public gatherings, etc.

In one embodiment, the geographic database 117 may include trajectory data records 209 for determining trajectory paths through a transportation structure. For example, the traversal data records 127 may include sensor data collected from UEs 101 that contain location traces through one or more transportation structures. The traversal data records 127 may also store the baseline paths determined by the estimation platform 103 as well as the results of classifying other location traces with respect to the baseline paths. In yet another embodiment, the traversal data records 127 include the results of additional analytics for indicating the flow of traffic through transportation structures, the volume of traffic flows through the structures and the like. In some embodiments, the traversal data records 127 can be further segmented or categorized according to one or more contextual parameters (e.g., temporal parameters, mode of transport parameters, vehicle type).

The geographic database 117 may be maintained by the content provider 111 (e.g., a map developer) or the provider of the services 109. By way of example, the content providers or service providers may employ different approaches for generating and/or storing the geographic data. This may include, for example, obtaining data from other sources, such as municipalities or respective geographic authorities. In addition, the providers may employ field personnel to travel by vehicle along roads throughout a geographic region in order to observe features and/or record information descriptive of a travel path, its surrounding environment, etc. Also, the providers may employ remote sensing, such as aerial or satellite photography.

The geographic database 117 may be a master geographic database stored in a format that facilitates updating, maintenance and development. For example, the master geographic database 117 or data in the master geographic database 119 may be generated according to an Oracle spatial format or other spatial format for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation system. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 117 may be a master geographic database, but in alternate embodiments, the database may represent a compiled navigation database that may be used in or with UE 101 to provide navigation or map-related functions. For example, the database 117 may be used with the UE 101 to provide a vehicle with navigation features. In such a case, the database may be downloaded or stored on the UE 101, or the UE 101 may access the database 117 through a wireless or wired connection (such as via a server and/or network 105).

In one embodiment, the UE 101 may be an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the UE 101 is a cellular telephone for executing the application 111 to present guidance information and map displays. It is contemplated, in future embodiments, that the cellular telephone may be interfaced with an on-board navigation system of an autonomous vehicle or physically connected to the vehicle for serving as the navigation system.

Figure 2:
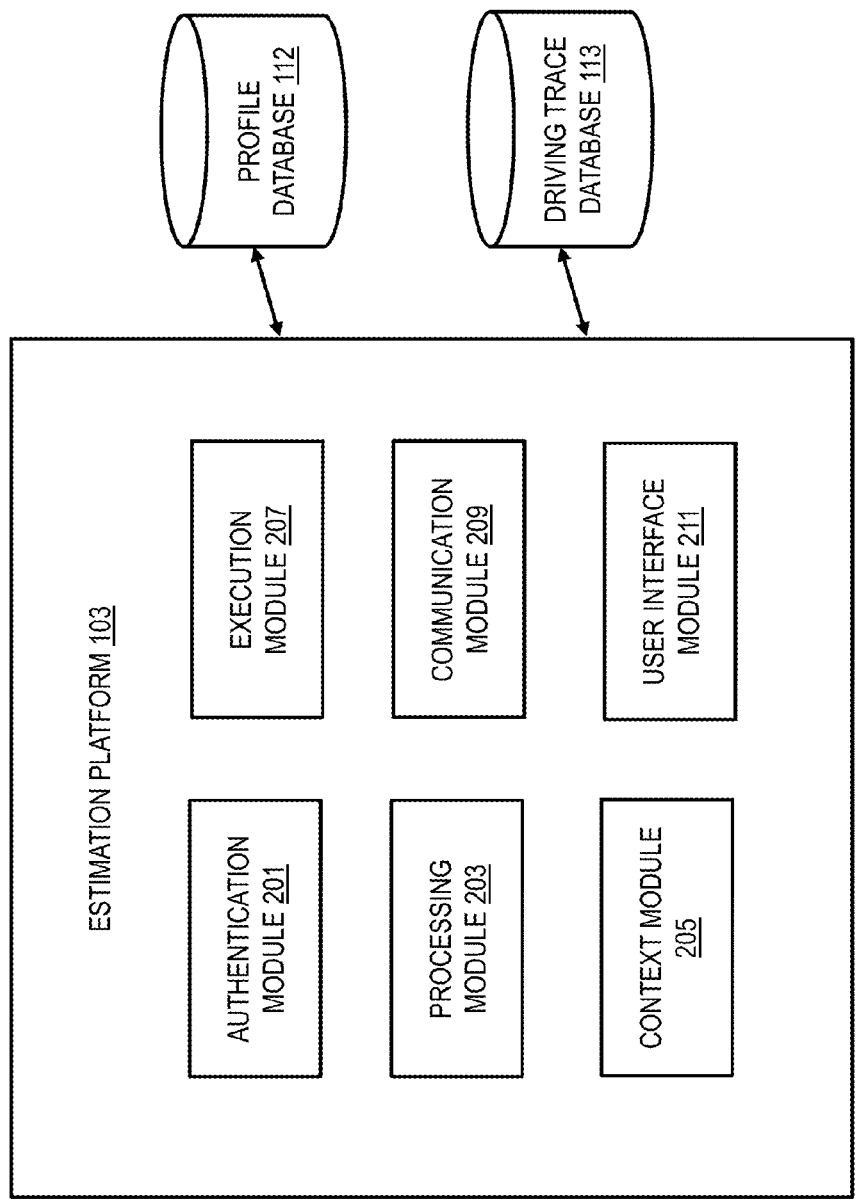
FIG. 2 is a diagram of the components of an estimation platform, according to one embodiment.

FIG. 2 is a diagram of the components of an estimation platform, according to one embodiment. By way of example, the estimation platform 103 includes one or more components for determining a position of a vehicle relative to a travel path based on driving behavior. It is contemplated that the functions of these components may be combined in one or more components or performed by other components of equivalent functionality. In this embodiment, the estimation platform 103 includes an authentication module 201, a processing module 203, a context module 205, a determination module 207, a communication module 209 and a user interface module 211.

The authentication module 201 authenticates users and UE 101 for interaction with the estimation platform 103. By way of example, the authentication module 201 receives a request to access the estimation platform 103 via an application 111. The request may be submitted to the authentication module 201 via the communication module 209, which enables an interface between the navigation application 111 and the platform 103. In addition, the authentication module 201 may receive a first-time subscription request from a UE 101, a request to store a profile at database 112, a permission message validating consent by a UE 101 to share contextual information with the platform 103, or a combination thereof. It is noted that the authentication module 201 may further be configured to support and/or validate the formation of profile by a provider of a service 109 or content provider 115, i.e., for supporting integration of the behavior characteristic information with other types of data.

The processing module 203 operates in connection with the context module 205 to interpret driving information associated with one or more vehicles as they navigate a travel path. The context module 203 gathers the sensor information generated by the sensors of the UE 101 for specifying the acceleration, curvature, tilt, velocity, driving mode, brake pressure, etc. In response, the processing module 203 evaluates this information against various criteria. The criteria may include, for example, variance thresholds, discrepancy factors and other metrics that when fulfilled, indicate a driving behavior to associate with the vehicle and the corresponding segment of the travel path. In addition, the processing module 203 identifies a best match behavior to associate with the vehicle per the segment of the travel path being used by the vehicle. This may include, for example, comparing data points comprising the current driving behavior (real-time driving information) to identify a matching pattern, movement, maneuver, shape, etc., with a historical driving behavior (historical driving information). It is noted that this enables the processing module 203 to determine which of the possible behaviors associated with a single segment of the travel path is best related to the current driving behavior exhibited by the vehicle.

The processing module 203 may also determine an offset between the current driving behavior associated with the vehicle for the given segment of the travel path and a historical driving behavior associated with other vehicles that have traveled the same segment. Under this scenario, the processing module 203 determines the offset (e.g., amount of difference) between the current estimated position of the vehicle and an expected estimated position of the vehicle. The offset may correspond to a longitudinal distance, a latitudinal distance, a geospatial coordinate shift, a time variance, or a combination thereof.

The execution module 207 corrects the estimated position of the vehicle based on the determined offset. This may include, for example, replacing the original estimated position of the vehicle with the corrected estimated position in order to compensate for behavior dynamics associated with the segment of the travel path. As such, the estimation platform 103 establishes and/or corrects the position based on movement type and/or maneuver pattern matching rather than physical object and/or road geometry matching.

The execution module 207 may also operate in connection with the communication module 209 and user interface module 211 to cause the transmission or rendering of an instruction respectively. By way of example, the execution module 207 may trigger the user interface module 211, which executes one or more application programming interface (API) executions of the platform 103 for presenting the segments of the travel path, the associated behavior and/or response types, etc. This may include presenting the corrected position or a representation thereof to the display of the navigation system. As another example, the execution module may trigger the communication module 209 to transmit an instruction for initiating a behavior and/or response of the vehicle based on the corrected estimated position. It is further noted that the user interface module 211 may operate in connection with the communication module 209 to facilitate the exchange of navigation information via the communication network 105 with respect to the services 109, content providers 115 and applications 111.

The above presented modules and components of the estimation platform 103 can be implemented in hardware, firmware, software, or a combination thereof. Though depicted as a separate entity in FIG. 1, it is contemplated that the platform 103 may be implemented for direct operation by respective UEs 101. As such, the estimation platform 103 may generate direct signal inputs by way of the operating system of the UE 101 for interacting with the application 111. In another embodiment, one or more of the modules 201-211 may be implemented for operation by respective UEs as a platform 103, cloud based service, or combination thereof.

Figure 4B:
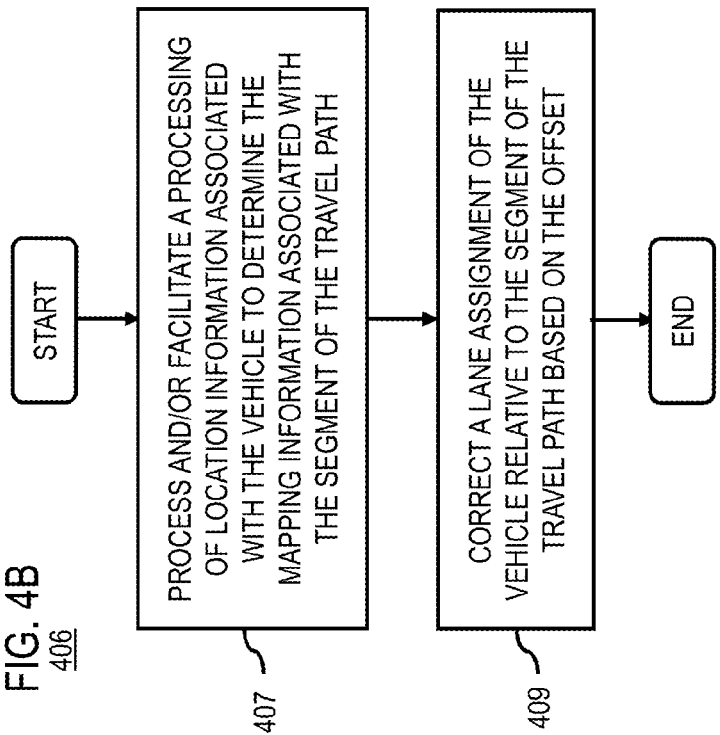
Figure 4A:
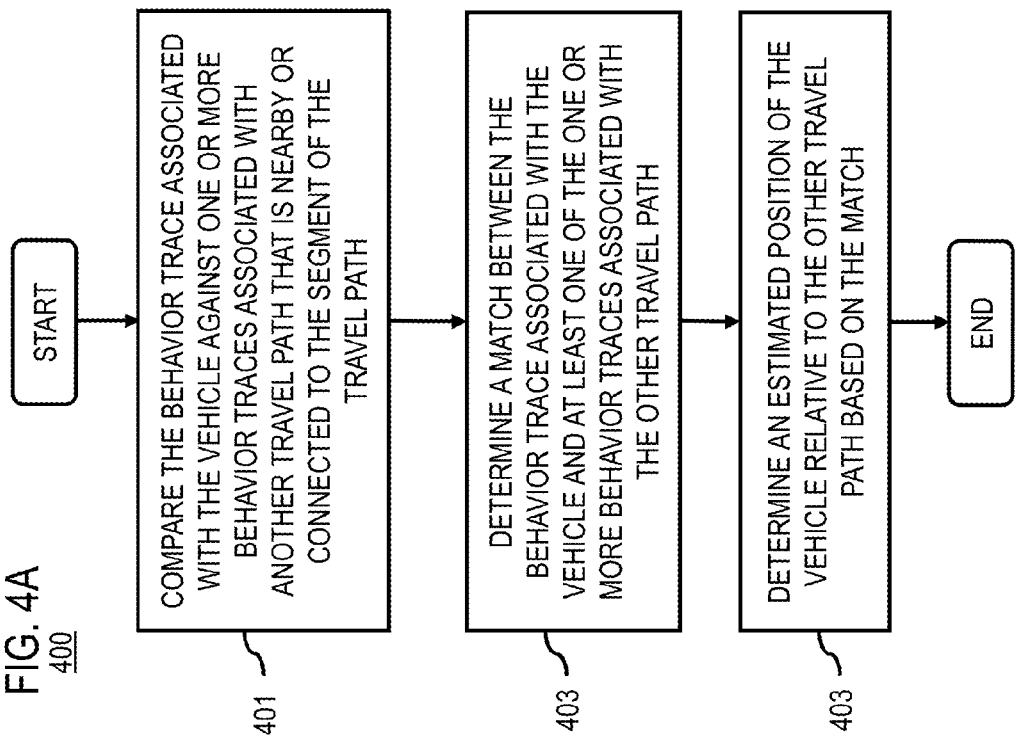
Figure 7:
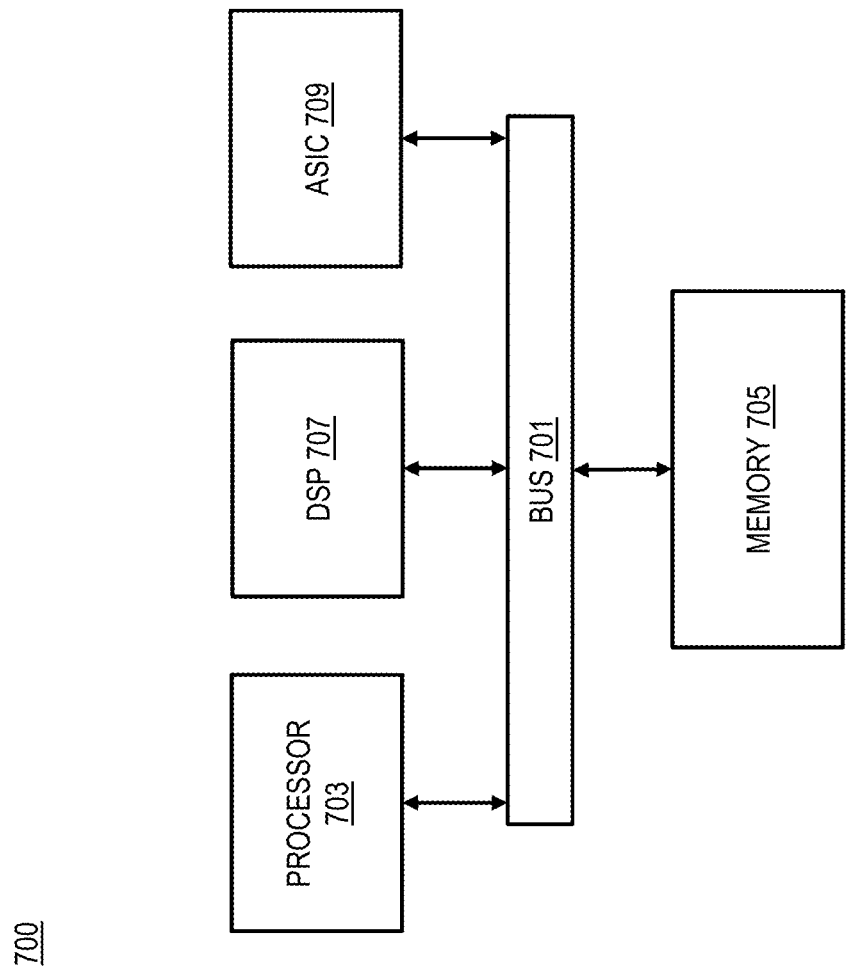
FIG. 7 is a diagram of a chip set that can be used to implement an embodiment of the invention.

FIGS. 3A, 3B and 4 are flowcharts of processes for determining a position of a vehicle relative to a travel path based on driving behavior, according to various embodiments. In one embodiment, the estimation platform 103 performs processes 300, 306 and 400 and is implemented in, for instance, a chip set including a processor and a memory as shown in FIG. 7.

In step 301 of process 300, the estimation platform 103 processes and/or facilitates a processing of driving information associated with a vehicle, mapping information associated with a segment of a travel path in use by the vehicle, or a combination thereof to determine a behavior trace to associate with the vehicle. As noted previously, the driving information may include acceleration information, velocity information, heading information, bearing information, orientation information, curvature information, distance information, turn information, tilt information, location marker information, steering information, brake usage information, wiper usage information, headlight usage information, navigation system usage information, stereo system usage information, vehicle state information, or a combination thereof.

In another step 303, the platform 103 determines a behavior trace associated with one or more other vehicles that used the segment of the travel path, the segment of the travel path, or a combination thereof to determine a match between the behavior trace of the vehicle and the behavior trace of the one or more other vehicles relative to the segment of the travel path. As noted previously, the driving information may be correlated with a behavior trace based on evaluation criteria, pattern matching analysis, or the like.

Per step 305, the estimation platform 103 determines an offset between the behavior trace of the vehicle and the behavior trace of the one or more other vehicles based on the match. As mentioned previously, the offset includes a shape differential, an amount of longitudinal distance, an amount of latitudinal distance, a geospatial coordinate shift, a time variance, or a combination thereof.

In step 307 of process 306 (FIG. 3B), the estimation platform 103 compares the behavior trace associated with the vehicle against the behavior trace information associated with the one or more other vehicles. In step 309, the platform 103 determines a level of affinity between the behavior trace associated with the vehicle and the behavior trace associated with the one or more other vehicles. The adjustment of the estimated position is performed based on the level of affinity. As noted previously, the affinity level may correspond to a probability or likelihood of match between the current driving behavior and at least one historic driving behavior associated with the segment of the travel path. Also, the level of affinity may correspond to the extent of shape matching between behavior traces, wherein a high level of affinity indicates a close match of the current driving behavior to a known behavior classification for a segment of the travel path.

Once the affinity is determined, the amount of offset between the driving information for the current versus the historic driving information need only be determined. In this way, the expected driving behavior serves as a reference point and/or corresponding reference data cluster set (e.g., curvature, acceleration, tilt) for evaluating current driving activity. It is noted that the behavior trace corresponds to a pattern of movements, maneuvers, responses, or a combination thereof of the vehicle, the one or more other vehicles, or a combination thereof with respect to the segment of the travel path, the other travel path, or a combination thereof over a period of time.

Per step 311, the estimation platform 103 adjusts the estimated position of the vehicle relative to the travel path based on the offset. The amount of offset may include an amount of longitudinal distance, an amount of latitudinal distance, a geospatial coordinate shift, a time variance, or a combination thereof. By way of example, in the case where the current behavior trace distance information is offset from the historical behavior trace for the segment of the travel path by 10 meters, the adjustment to the estimated position of the vehicle is 10 meters. In certain embodiments, it is contemplated that an adjustment factor may be applied to the offset for translating the offset across different measurement types, action types, road segments, etc.

In another step 313, the estimation platform 103 causes, at least in part, (a) a rendering of updated mapping information, (b) a rendering of updated display elements representative of the vehicle, the travel path, or a combination thereof, (c) a rendering of a message to the display for specifying the adjustment, (d) a generating of an instruction to correct a driving maneuver of the vehicle, or (e) a combination thereof based on the correction. It is noted that the amount of the offset may translate into an amount, mode or means of rendering of content and/or execution of a generated instruction.

In step 401 of process 400 (FIG. 4A), the estimation platform 103 compares the behavior trace associated with the vehicle against one or more behavior traces associated with another travel path that is nearby or connected to the segment of the travel path. In another step 403, the platform 103 determines a match between the behavior trace associated with the vehicle and at least one of the one or more behavior traces associated with the other travel path. Per step 405, the platform 103 further determines an estimated position of the vehicle relative to the other travel path based on the match. By way of example, in the case where a vehicle is traveling along a roadway that splits into two separate links, the estimation platform 103 may adjust or determine the estimated position of the vehicle based behavior trace information regarding one of the split links. Under this approach, the estimation platform 103 identifies, In step 407 of process 406 (FIG. 4B), the estimation platform 103 processes and/or facilitates a processing of location information associated with the vehicle to determine the mapping information associated with the segment of the travel path. As noted previously, the mapping information is associated with at least one expected driving behavior trace. This may include storing the mapping information with the behavior trace or classifications thereof to the geographic database 117, the trace database 113, etc. Alternatively, the mapping information may specify a reference or link to the expected driving behavior as classified within the trace database 113. Under this scenario, for example, the content providers 115 or provider of the services 109 may reference the trace database 113 in response to a navigation request.

In step 409, the estimation platform 103 corrects a lane assignment of the vehicle relative to the segment of the travel path based on the offset. By way of example, an estimated position of the vehicle for indicating the vehicle is in a first lane of a highway may be corrected to indicate the vehicle is in a second lane based on the offset (amount thereof). As noted previously, this correction may be further translated into an updated rendering of mapping information and associated graphic elements for representing the vehicle in the correct lane relative to the travel path.

FIGS. 5A-5E are diagrams for depicting the positioning and movement of vehicles relative to a travel path, according to various embodiments. For the purpose of illustration, the estimation platform 103 is configured to interact with a navigation system (e.g., UE 101) of the vehicle to determine an estimated position of a vehicle as it travels along a segment 501 of the travel path based on driving behavior.

Figure 5A:
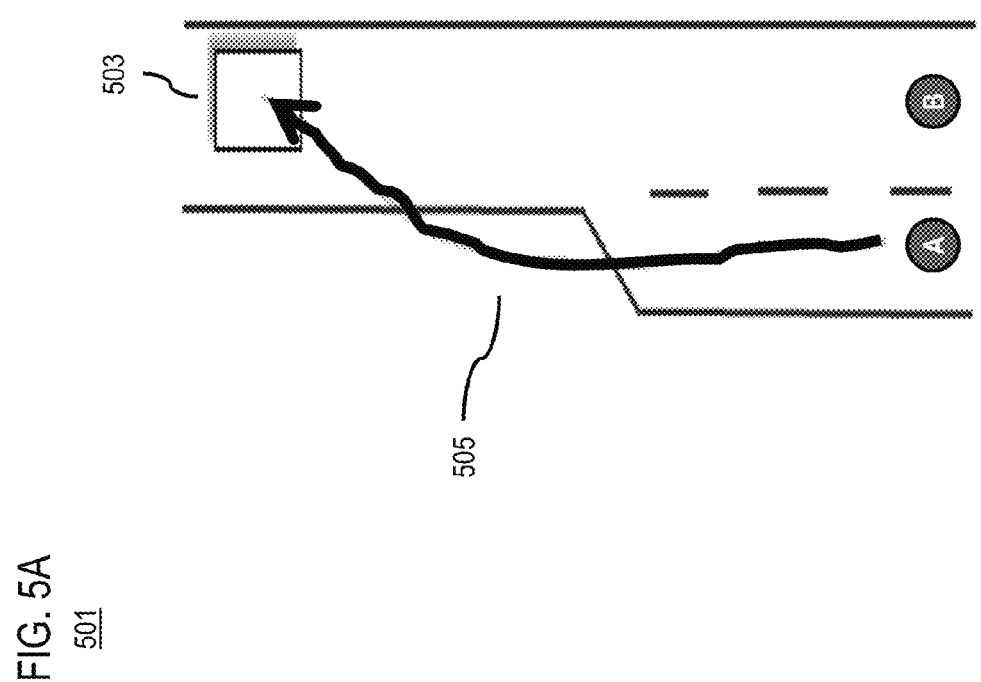
Figure 5B:
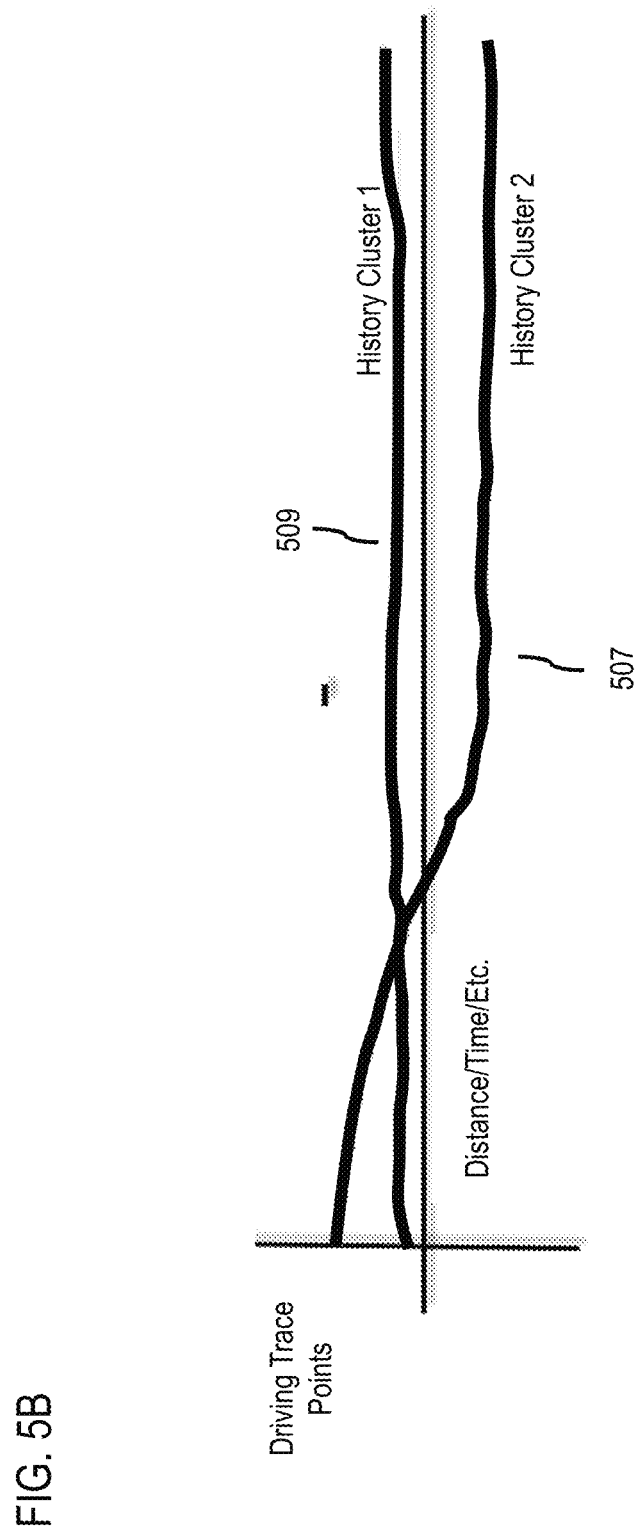

In FIG. 5A, a segment of a travel path 501 is in use by a vehicle 503 as represented in block form. At a certain point along the segment of the travel path 501, the vehicle moves from a first lane labeled A to a second lane labeled B, corresponding to a movement pattern or maneuver type 505. The movement pattern or maneuver type 505 corresponds to various actions performed by the vehicle and/or driver for a given distance/time period, including, an acceleration or deceleration rate, a curvature or turn trajectory, brake pressure application, etc. Consequently, various sensors of the vehicle 503 and/or the navigation system record these actions, for the duration or extent of the travel path, as driving information. This driving information is then transmitted to the estimation platform 103 by the navigation system of the vehicle and subsequently monitored by the estimation platform 103. In addition, mapping information corresponding to the location of the vehicle 503 and the segment of the travel path 501 is retrieved accordingly. It is noted that the position of the vehicle 503, as shown, represents a current estimated position of the vehicle 503 relative to the segment of the travel path—i.e., the perceived position of the vehicle according to the navigation system.

Upon receiving the driving information, the estimation platform 103 determines one or more driving behaviors (traces) 507 and 509 are associated with the segment of the travel path 501 corresponding to the retrieved mapping information. Under this scenario, the mapping information may include or make reference to the behavior trace database 113 for retrieving the historical behavior traces. By way of example, the distinct behaviors 507 and 509 are shown in vector/line (trace) form in FIG. 5B for representing the plurality of driving trace points collected in association with other vehicles that traveled the travel path over a period of time, over a distance range, etc.

Once determined, the estimation platform 103 analyzes the current driving behavior (trace) 511 against the historical driving behavior traces 507 and 509. The analysis may include, for example, shape and/or form matching the current behavior trace 511 to the historical behavior traces 507 and 509 to determine a level of affinity between the current behavior trace 511 and at least one of the historical traces. Under this scenario, a best match driving behavior is determined between the current behavior trace 511 and historic behavior trace 507, as depicted in FIG. 5C. Trace 507 corresponds to the second history cluster data set (behavior type) associated with the travel path. As depicted herein, it also best matches the shape (behavior) of the real-time behavior trace 511 for the vehicle.

It is noted that the affinity may be determined based on evaluation criteria, comparative data analysis techniques, etc. In the case where the behavior traces match exactly (highest affinity), the estimation platform 103 is able to determine the current behavior pattern matches the historical pattern. Under this scenario, the estimation platform 103 concludes that the current estimated position of the vehicle is accurate. While described herein as shape and/or form matching, it is noted that the best match corresponds to a matching of respective driving trace points (e.g., acceleration, curvature, distance, brake application, vehicle status, etc.) over the course of time, over a distance range traveled, etc.

In the case where the behavior traces are shifted (offset), but otherwise have a similar shape (some affinity), the estimation platform 103 determines the amount of shift (offset). It then adjusts/corrects the estimated position of the vehicle accordingly based on the amount of offset (i.e., a longitudinal distance, a coordinate shift) applied to the behavior trace of the vehicle. In the case, however, where the behavior traces appear unrelated (i.e., no affinity or shape match), no adjustment is made to the estimated position as the associated behavior for the segment of the travel path is unrecognized.

In FIG. 5D, the estimation platform 103 determines an amount of offset (e.g., shift) between the current driving trace 511a and the historic, best matching, driving trace 507. The offset is depicted herein by a line 513, which represents an amount of longitudinal, latitudinal, geospatial or positional shift required to correct the estimated position of the vehicle. Hence, the offset 513 indicates the vehicle 503 has a positioning error and the extent of offset 513 correlates to the extent of error. Under this scenario, the offset is determined to be 50 meters.

Figure 5E:
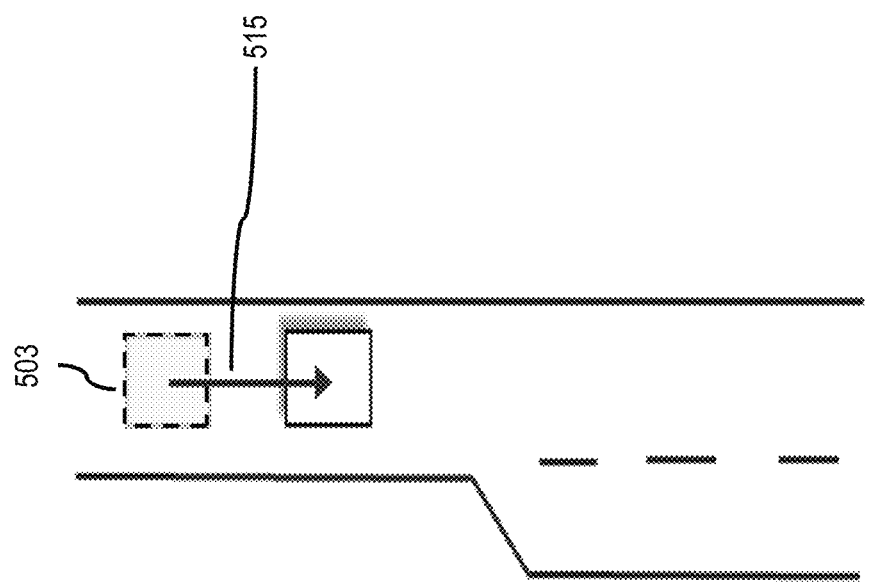

To improve (correct) the estimated position of the vehicle, the estimation platform 103 then adjusts the current estimated position by the offset amount of 50 meters. This is represented in FIG. 5D as a shifting (offsetting) of the current behavior trace 511a to match, or overlap, the historic driving trace 507. The shifted behavior trace is shown as line 511b. The effect of this shift is depicted in FIG. 5E, which shows the initial estimated position of the vehicle 503 being adjusted by the offset amount of 50 meters, as represented by line 515. It is noted that the adjustment may correspond to an updating of mapping information and corresponding display elements for depicting the vehicle to a display of the navigation system. Also, various messages may be rendered to the display for indicating the correction.

The processes described herein for determining a position of a vehicle relative to a travel path based on driving behavior may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
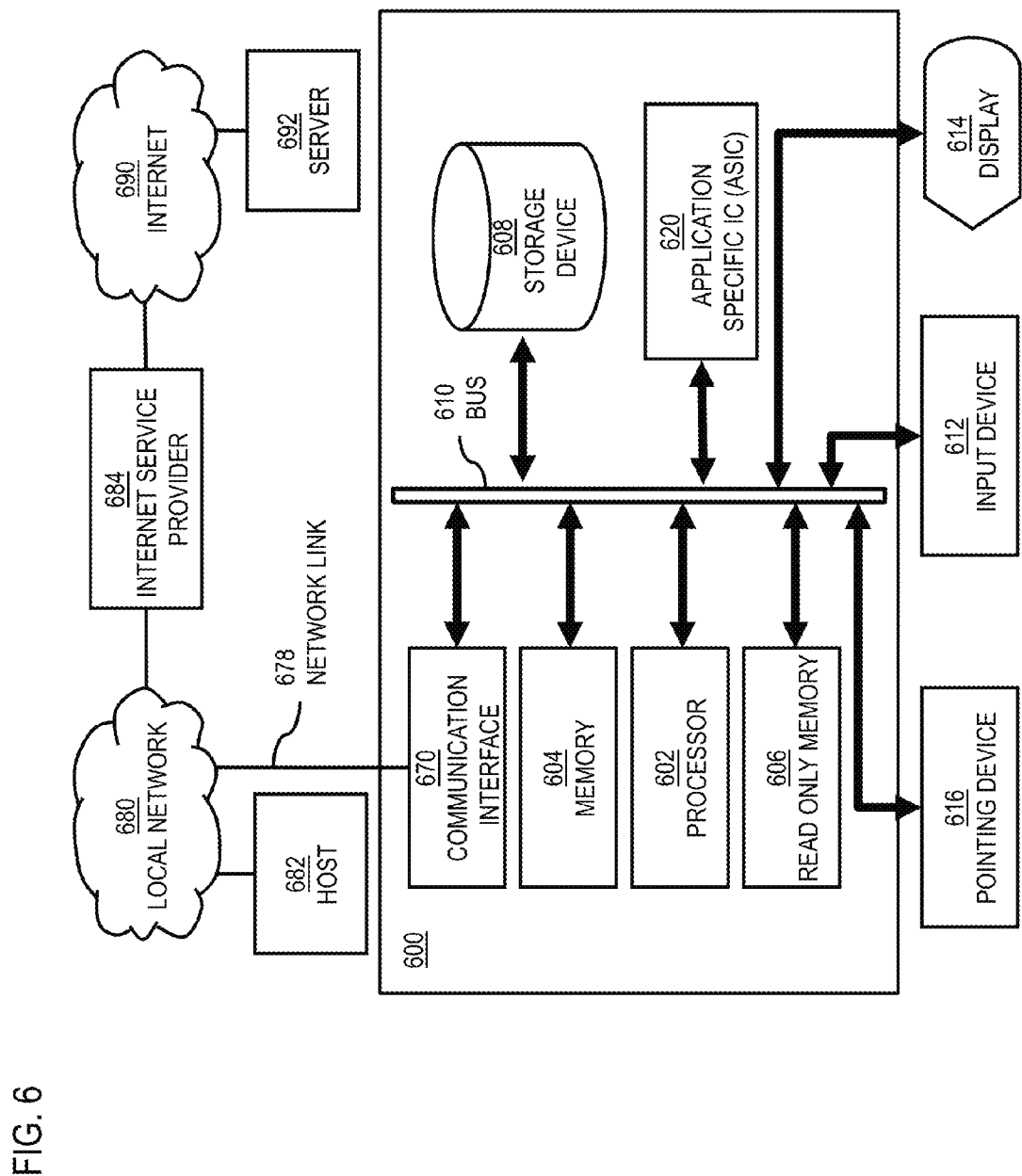
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to determine a position of a vehicle relative to a travel path based on driving behavior as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of determining a position of a vehicle relative to a travel path based on driving behavior.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to determine a position of a vehicle relative to a travel path based on driving behavior. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for determining a position of a vehicle relative to a travel path based on driving behavior. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for determining a position of a vehicle relative to a travel path based on driving behavior, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for determining a position of a vehicle relative to a travel path based on driving behavior to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to determine a position of a vehicle relative to a travel path based on driving behavior as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of determining a position of a vehicle relative to a travel path based on driving behavior.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to determine a position of a vehicle relative to a travel path based on driving behavior. The memory 705 also stores the data associated with or generated by the execution of the inventive steps.

Figure 8:
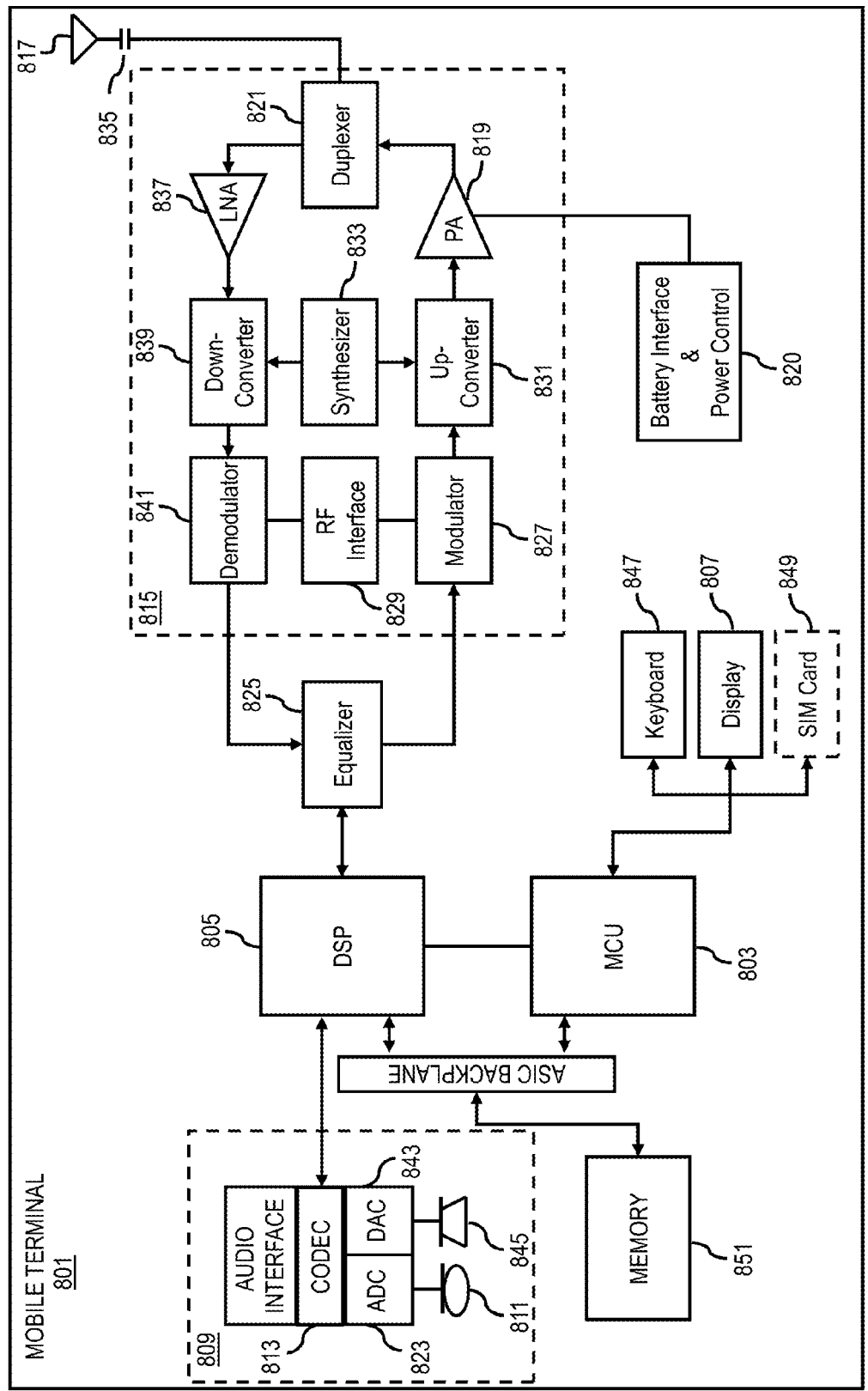
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of determining a position of a vehicle relative to a travel path based on driving behavior. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of determining a position of a vehicle relative to a travel path based on driving behavior. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs user interface software to facilitate user control of at least some functions of the mobile terminal 801 to determine a position of a vehicle relative to a travel path based on driving behavior. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing with a processor, driving information associated with a vehicle, mapping information associated with a segment of a travel path in use by the vehicle, or a combination thereof to determine a behavior trace to associate with the vehicle;
   determining a behavior trace associated with one or more other vehicles that used the segment of the travel path, another travel path that is nearby or connected to the segment of the travel path, or a combination thereof to determine a match between the behavior trace of the vehicle and the behavior trace of the one or more other vehicles relative to the segment of the travel path;
   determining an offset between the behavior trace of the vehicle and the behavior trace of the one or more other vehicles based on the match; and
   processing of location information associated with the vehicle to determine the mapping information associated with the segment of the travel path,
   wherein the mapping information is associated with at least one behavior trace, and
   wherein the mapping information specifies one or more links, one or more nodes, one or more surfaces, one or more points of interest, or a combination thereof associated with the travel path, the at least one behavior trace, or a combination thereof and the at least one behavior trace corresponds to a pattern of movements, maneuvers, responses, or a combination thereof of the vehicle, the one or more other vehicles, or a combination thereof with respect to the segment of the travel path, the other travel path that is nearby or connected to the segment of the travel path, or a combination thereof over a period of time.

2. A method of claim 1, further comprising:
   adjusting an estimated position of the vehicle relative to the travel path based on the offset,
   wherein the offset includes a shape differential, an amount of longitudinal distance, an amount latitudinal distance, a geospatial coordinate shift, a time variance, or a combination thereof.

3. A method of claim 2, further comprising:
   comparing the behavior trace associated with the vehicle against the behavior trace associated with the one or more other vehicles; and
   determining a level of affinity between the behavior trace associated with the vehicle and the behavior trace associated with the one or more other vehicles,
   wherein the adjustment is based on the level of affinity.

4. A method of claim 2, further comprising:
   causing, at least in part, (a) a rendering of updated mapping information, (b) a rendering of updated display elements representative of the vehicle, the travel path, or a combination thereof, (c) a rendering of a message to the display for specifying the adjustment, (d) a generating of an instruction to correct a driving maneuver of the vehicle, or (e) a combination thereof based on the adjustment of the estimated position.

5. A method of claim 4, wherein a navigation system associated with the vehicle, the one or more other vehicles, or a combination thereof executes the rendering, the driving maneuver, or a combination thereof and the vehicle, the one or more other vehicles, or a combination thereof are autonomous.

6. A method of claim 1, further comprising:
   comparing the behavior trace associated with the vehicle against one or more behavior traces associated with the other travel path that is nearby or connected to the segment of the travel path;
   determining a match between the behavior trace associated with the vehicle and at least one of the one or more behavior traces associated with the other travel path; and
   determining an estimated position of the vehicle relative to the other travel path based on the match.

7. A method comprising:
   processing with a processor, driving information associated with a vehicle, mapping information associated with a segment of a travel path in use by the vehicle, or a combination thereof to determine a behavior trace to associate with the vehicle;
   determining a behavior trace associated with one or more other vehicles that used the segment of the travel path, the segment of the travel path, or a combination thereof to determine a match between the behavior trace of the vehicle and the behavior trace of the one or more other vehicles relative to the segment of the travel path;
   determining an offset between the behavior trace of the vehicle and the behavior trace of the one or more other vehicles based on the match; and
   correcting a lane assignment of the vehicle relative to the segment of the travel path based on the offset,
   wherein the estimated position of the vehicle is adjusted based on the corrected lane assignment.

8. A method of claim 1, wherein the driving information includes acceleration information, velocity information, heading information, bearing information, orientation information, curvature information, distance information, turn information, tilt information, location marker information, steering information, brake usage information, wiper usage information, headlight usage information, navigation system usage information, stereo system usage information, vehicle state information, or a combination thereof.

9. An apparatus comprising:
   at least one processor; and
   at least one memory including computer program code for one or more programs,
   the at least one memory and the computer program code configured to, with the at least one processor, cause the apparatus to perform at least the following,
      process driving information associated with a vehicle, mapping information associated with a segment of a travel path in use by the vehicle, or a combination thereof to determine a behavior trace to associate with the vehicle;
      determine a behavior trace associated with one or more other vehicles that used the segment of the travel path, another travel path that is nearby or connected to the segment of the travel path, or a combination thereof to determine a match between the behavior trace of the vehicle and the behavior trace of the one or more other vehicles relative to the segment of the travel path;

determine an offset between the behavior trace of the vehicle and the behavior trace of the one or more other vehicles based on the match; and process location information associated with the vehicle to determine the mapping information associated with the segment of the travel path, wherein the mapping information is associated with at least one behavior trace, and wherein the mapping information specifies one or more links, one or more nodes, one or more surfaces, one or more points of interest, or a combination thereof associated with the travel path, the at least one behavior trace, or a combination thereof and the at least one behavior trace corresponds to a pattern of movements, maneuvers, responses, or a combination thereof of the vehicle, the one or more other vehicles, or a combination thereof with respect to the segment of the travel path, the other travel path that is nearby or connected to the segment of the travel path, or a combination thereof over a period of time.

10. An apparatus of claim 9, wherein the apparatus is further caused to:

adjust an estimated position of the vehicle relative to the travel path based on the offset, wherein the offset includes a shape differential, an amount of longitudinal distance, an amount of latitudinal distance, a geospatial coordinate shift, a time variance, or a combination thereof.

11. An apparatus of claim 10, wherein the apparatus is further caused to:

compare the behavior trace associated with the vehicle against the behavior trace information associated with the one or more other vehicles; and determine a level of affinity between the behavior trace associated with the vehicle and the behavior trace information associated with the one or more other vehicles, wherein the adjustment is based on the level of affinity.

12. An apparatus of claim 10, wherein the apparatus is further caused to:

cause, at least in part, (a) a rendering of updated mapping information, (b) a rendering of updated display elements representative of the vehicle, the travel path, or a combination thereof, (c) a rendering of a message to the display for specifying the adjustment, (d) a generating of an instruction to correct a driving maneuver of the vehicle, or (e) a combination thereof based on the adjustment of the estimated position.

13. An apparatus of claim 12, wherein a navigation system associated with the vehicle, the one or more other vehicles, or a combination thereof executes the rendering, the driving maneuver, or a combination thereof and the vehicle, the one or more other vehicles, or a combination thereof are autonomous.

14. A non-transitory computer-readable storage medium carrying one or more sequences of one or more instructions which, when executed by one or more processors, cause an apparatus to perform:

processing of driving information associated with a vehicle, mapping information associated with a segment of a travel path in use by the vehicle, or a combination thereof to determine a behavior trace to associate with the vehicle;

determining a behavior trace associated with one or more other vehicles that used the segment of the travel path, another travel path that is nearby or connected to the segment of the travel path, or a combination thereof to determine a match between the behavior trace of the vehicle and the behavior trace of the one or more other vehicles relative to the segment of the travel path;

determining an offset between the behavior trace of the vehicle and the behavior trace of the one or more other vehicles based on the match; and processing of location information associated with the vehicle to determine the mapping information associated with the segment of the travel path, wherein the mapping information is associated with at least one behavior trace, and wherein the mapping information specifies one or more links, one or more nodes, one or more surfaces, one or more points of interest, or a combination thereof associated with the travel path, the at least one behavior trace, or a combination thereof and the at least one behavior trace corresponds to a pattern of movements, maneuvers, responses, or a combination thereof of the vehicle, the one or more other vehicles, or a combination thereof with respect to the segment of the travel path, the other travel path that is nearby or connected to the segment of the travel path, or a combination thereof over a period of time.

15. A non-transitory computer-readable storage medium of claim 14, wherein the apparatus is further caused to perform:

adjusting an estimated position of the vehicle relative to the travel path based on the offset, wherein the offset includes a shape differential, an amount of longitudinal distance, an amount of latitudinal distance, a geospatial coordinate shift, a time variance, or a combination thereof.

16. A non-transitory computer-readable storage medium of claim 15, wherein the apparatus is further caused to perform:

comparing the behavior trace associated with the vehicle against the behavior trace information associated with the one or more other vehicles; and determining a level of affinity between the behavior trace associated with the vehicle and the behavior trace information associated with the one or more other vehicles, wherein the adjustment is based on the level of affinity.

* * * * *